(12) United States Patent
Ferguson

(10) Patent No.: US 11,171,508 B2
(45) Date of Patent: Nov. 9, 2021

(54) SYSTEM AND METHOD FOR SHARED HYBRID TRANSFER SWITCH

(71) Applicant: Vertiv Corporation, Columbus, OH (US)

(72) Inventor: Kevin R. Ferguson, Dublin, OH (US)

(73) Assignee: Vertiv Corporation, Columbus, OH (US)

( * ) Notice: Subject to any disclaimer, the term of this patent is extended or adjusted under 35 U.S.C. 154(b) by 0 days.

(21) Appl. No.: 16/867,306

(22) Filed: May 5, 2020

(65) Prior Publication Data

US 2020/0358309 A1 Nov. 12, 2020

Related U.S. Application Data

(60) Provisional application No. 62/843,884, filed on May 6, 2019.

(51) Int. Cl.
*H02J 9/00* (2006.01)
*H02J 7/00* (2006.01)
*H02J 9/06* (2006.01)

(52) U.S. Cl.
CPC .................... *H02J 9/068* (2020.01)

(58) Field of Classification Search
CPC .... H02J 9/068; H02J 9/062; H02J 9/04; H02J 3/0073; H02J 3/005
See application file for complete search history.

(56) References Cited

U.S. PATENT DOCUMENTS 5,210,685 A 5/1993 Rosa
5,699,218 A 12/1997 Kadah
5,814,904 A 9/1998 Galm
(Continued)

FOREIGN PATENT DOCUMENTS

DE 102011005563 A1 9/2012
EP 2681825 A2 1/2014

OTHER PUBLICATIONS

International Search Report and Written Opinion regarding International Application No. PCT/US2020/031677 dated Jul. 13, 2020.
(Continued)

*Primary Examiner* — Hal Kaplan
*Assistant Examiner* — Rasem Mourad
(74) *Attorney, Agent, or Firm* — Harness, Dickey & Pierce, P.L.C.

(57) ABSTRACT

The present disclosure relates to a shared hybrid transfer switch for transferring power received by a Load from a preferred AC power source to an alternate AC power source, or transferring power being received by the Load from the alternate AC power source to the preferred AC power source. The transfer switch makes use of a solid-state switch configured in communication with first and second pluralities of relay contacts, and also being coupled to the Load, and which receives control signals from a controller. The solid-state switch is controlled such that it is turned on to be in communication with select ones of the first and second pluralities of relay contacts, to provide a path for current flow to the Load from one of the preferred or alternate AC power sources being transitioned to, to carry out a switching transition from one of the preferred or alternate AC power sources to the other.

22 Claims, 8 Drawing Sheets

(56) References Cited

U.S. PATENT DOCUMENTS

| | | | |
|---|---|---|---|
| 6,465,911 B1* | 10/2002 | Takeda | H02J 9/061 |
| | | | 307/70 |
| 7,352,082 B2 | 4/2008 | Marwali et al. | |
| 7,405,910 B2 | 7/2008 | Maitra et al. | |
| 7,459,804 B2 | 12/2008 | Marwali et al. | |
| 7,535,129 B2* | 5/2009 | Phelps | H02J 9/061 |
| | | | 307/115 |
| 7,932,635 B2 | 4/2011 | Shenoy et al. | |
| 7,960,862 B2 | 6/2011 | Smith et al. | |
| 8,416,592 B2 | 4/2013 | Zhang et al. | |
| 8,508,890 B2 | 8/2013 | Zheng et al. | |
| 8,699,253 B2 | 4/2014 | Zhang et al. | |
| 8,928,184 B2 | 1/2015 | Ganesan | |
| 9,467,006 B2 | 10/2016 | Dickerson et al. | |
| 9,484,771 B2 | 11/2016 | Braylovskiy et al. | |
| 9,520,874 B2 | 12/2016 | Bush et al. | |
| 9,537,348 B2 | 1/2017 | Bertuzzi et al. | |
| 9,627,924 B2 | 4/2017 | Larson | |
| 9,754,745 B2 | 9/2017 | Suchoff | |
| 9,876,390 B2 | 1/2018 | Bush et al. | |
| 2006/0006742 A1 | 1/2006 | Galm | |
| 2006/0269186 A1* | 11/2006 | Frame | H03H 7/24 |
| | | | 385/12 |
| 2012/0299381 A1 | 11/2012 | Larson | |
| 2014/0269860 A1* | 9/2014 | Brown | H04B 3/54 |
| | | | 375/219 |
| 2016/0056632 A1* | 2/2016 | Hansson | H02P 7/293 |
| | | | 307/52 |
| 2016/0197483 A1 | 7/2016 | Steinert et al. | |
| 2018/0026570 A1* | 1/2018 | Cairoli | H02H 7/005 |
| | | | 307/112 |

OTHER PUBLICATIONS

Shukla, Anshuman et al. "A Survey on Hybrid Circuit-Breaker Topologies", IEEE Transactions on Power Delivery, vol. 30, No. 2, Apr. 2015, pp. 627-241.

* cited by examiner

3- Phase Delta AC Power Source Configuration

SYSTEM AND METHOD FOR SHARED HYBRID TRANSFER SWITCH

CROSS-REFERENCE TO RELATED APPLICATIONS

This application claims the benefit of U.S. Provisional Application No. 62/843,884, filed on May 6, 2019. The entire disclosure of the above application is incorporated herein by reference.

FIELD

The present disclosure relates to transfer switches used in data centers and other facilities to transfer power being supplied to one or more loads from one power source to a different power source, and more particularly to a shared, hybrid transfer switch system which enables the switching time to be significantly reduced when transferring a load from a first power source to a second power source.

BACKGROUND

This section provides background information related to the present disclosure which is not necessarily prior art.

In various types of facilities, and particularly in modern day data centers, a transfer switch is used to reliably facilitate switching of the downstream power distribution infrastructure between two independent power sources (e.g., utility and backup power) so that uninterrupted operation of the connected equipment (e.g., servers, routers, etc.) is maintained. The transfer may occur automatically when suboptimal power quality conditions are detected on the active source. The transfer may also be initiated manually by a worker at the facility when maintenance of the active power source is required.

The transfer switch is manufactured in a variety of physical forms, performance capabilities, and range of ampacities for single and three-phase power distribution. In data center applications, the transfer switch is preferably located within an equipment rack (i.e., within the rack "space"). It supplies input either directly to IT equipment, via its own receptacles, or to other rack power distribution equipment (e.g., power strips).

The transfer switch's electrical switching uses contacts of electromechanical relays that are electrically interconnected in series and parallel combination. During transfer, these relays are precisely controlled to open the electrical circuit between the previously active source and load, and to quickly close the new circuit for the newly active source, while ensuring that the two sources remain electrically isolated from each other. The sequence can be "break-before-make", in which the active contacts are opened before the new contacts are closed (also referred to as an "open transition"), or "make-before-break", in which the new contacts are closed before the previous contacts are opened (also referred to as "closed transition"). The voltage phasing of the new power source and load may be unsynchronized for open transition or, in the case of closed transition, must be synchronized.

The Information Technology Industry Council ("ITIC") Computer and Business Equipment Manufacturers Association ("CBEMA") Curve describes the AC input voltage envelope that can be tolerated by an IT load with no interruption in function. Transfer switching performance should at least conform to the maximum limits of this Curve, i.e., faster than 20 ms at 70% voltage. For greater market competitiveness, transfer should complete within one-half line cycle, i.e., less than or equal to 8 ms at 60 Hz line frequency. However, typical electromechanical relay contacts operate at release and closure times that cannot achieve such performance for an open transition. Further, reliable detection of power quality conditions and management of the transfer to prevent cross conduction of sources or failure of components typically result in additional incremental delays, which make it difficult or impossible to meet this one-half line cycle transfer timeframe.

To achieve faster transfer time, switching performance of the relay's contacts may be enhanced by use of a solid-state switching device, for example, a TRIAC (bidirectional/bilateral triode thyristor), anti-parallel SCR (silicon-controlled rectifier) pairs, or an IGBT (insulated-gate bipolar transistor). Solid-state relays have previously been used in combination with electromechanical relays in hybrid switching configurations. In these hybrid solutions, terminals of the solid-state switches are permanently electrically connected in parallel with the relay contacts, such that a dedicated solid-state switch is required for both first and second power sources. However, solid-state switches require more parts as well as expensive isolated drive circuitry. Accordingly, a circuit design that reduces the number of solid-state switches would reduce cost and simplify the transfer circuit.

It is also known that the internal power supply of some IT equipment can cause large in-rush currents to flow through the transfer circuits during cold starts (i.e., at power cycle), due to the capacitors being discharged and having low input capacitive reactance. The magnitude of in-rush current can exceed the rating of the relay contacts by an order of magnitude and, if not properly mitigated, can damage or destroy the relay contacts and possibly cause an energy hazard. Accordingly, a circuit design feature which enables a "soft start", which momentarily reduces or limits the in-rush current through the transfer switching circuit when switching from one power source to another, would be extremely valuable in protecting the electronic components of the transfer circuit.

SUMMARY

This section provides a general summary of the disclosure, and is not a comprehensive disclosure of its full scope or all of its features.

In one aspect the present disclosure relates to a shared hybrid transfer switch for transferring power received by a Load from a preferred AC power source to an alternate AC power source, or transferring power being received by the Load from the alternate AC power source to the preferred AC power source. The shared hybrid switch may comprise a first plurality of relay contacts in communication with the preferred AC power source and with the Load, and a second plurality of relay contacts in communication with the alternate AC power source and the Load. First select ones of the first and second pluralities of relay contacts are connected at a first common connection point with one another and form current paths to the Load when either is closed. A solid-state switch is included which is configured to receive control signals from a controller. The solid-state switch is coupled in series with the load, and on a first side with the first common connection point, and on a second side at a second common connection point, and to enable communication with either the preferred AC power source or the alternate AC power source, and also able to be at least momentarily coupled in parallel with select ones of the first and second pluralities of relay contacts. The solid-state switch is controlled such that it is turned on to be in communication with one or the other of the select ones of the first and second pluralities of relay contacts, and also with the Load, to provide a path for current flow to the Load from one of the preferred or alternate AC power sources being transitioned to, while the second select ones of the first and second pluralities of relays are momentarily open, to thus enable a switching transition to be made from one of the preferred or alternate AC power sources to the other.

In another aspect the present disclosure relates to a method of forming a shared hybrid transfer switch for transferring power received by a Load from a preferred AC power source to an alternate AC power source, or transferring power being received by the Load from the alternate AC power source to the preferred AC power source. The method may comprise providing a first plurality of relay contacts in communication with the preferred AC power source and with the Load, and providing a second plurality of relay contacts in communication with the alternate AC power source and the Load. The method may involve configuring first select ones of the first and second pluralities of relay contacts such that common sides thereof are connected at a first common connection point, and also in communication with the Load when either is closed. The method may further include configuring second select ones of the first and second pluralities of relay contacts such that common sides thereof are connected at a second common connection point. The method may include controlling a solid-state switch configured to receive control signals from a controller, and coupled on a first side in communication with the first connection point, and on a second side in communication with the second connection point, and further able to be coupled with the load and with either of the preferred AC power source and the alternate AC power source. The solid-state switch may be controlled to carry out a switching transition from one of the preferred or alternate AC power sources to the other, by selectively using ones of the first and second pluralities of relay contacts.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In the drawings.

Corresponding reference numerals indicate corresponding parts throughout the several views of the drawings.

DETAILED DESCRIPTION

Example embodiments will now be described more fully with reference to the accompanying drawings.

The present disclosure, in the various embodiments discussed below, enables significantly faster transfer times that what is typically possible with present day electromechanical relays. In various embodiments, the switching performance of the relays is enhanced by use of a solid-state switching device, for example a TRIAC (bidirectional/bilateral triode thyristor), anti-parallel SCR (silicon-controlled rectifier) pairs, or an IGBT (insulated-gate bipolar transistor). The selected solid-state switching device is in connection with the relays' contacts and can close the circuit faster by two or three orders of magnitude that what is possible using just conventional electromechanical relays. Further, the solid-state switching device makes a configurable connection between either of the corresponding poles of the relay contacts of the circuits of the two power sources, such that the solid-state switching device is shared between the circuits of the two power sources. Thus the same solid-state switching circuit may be configured on the side of the active power source to provide soft-start during power up (cold start) or configured on the side of the inactive power source to facilitate a fast transfer. In the various embodiments discussed below, the solid-state device is kept activated until the relay contacts have settled into a closed state. During steady-state operation of the active source, the solid-state switch may be switched into connection with the relay contacts of the inactive source circuit to decrease the make time transfer. Importantly, the various embodiments all provide a soft-start feature which helps to limit the in-rush current through the components of the system when switching from one power source to another.

Figure 1:
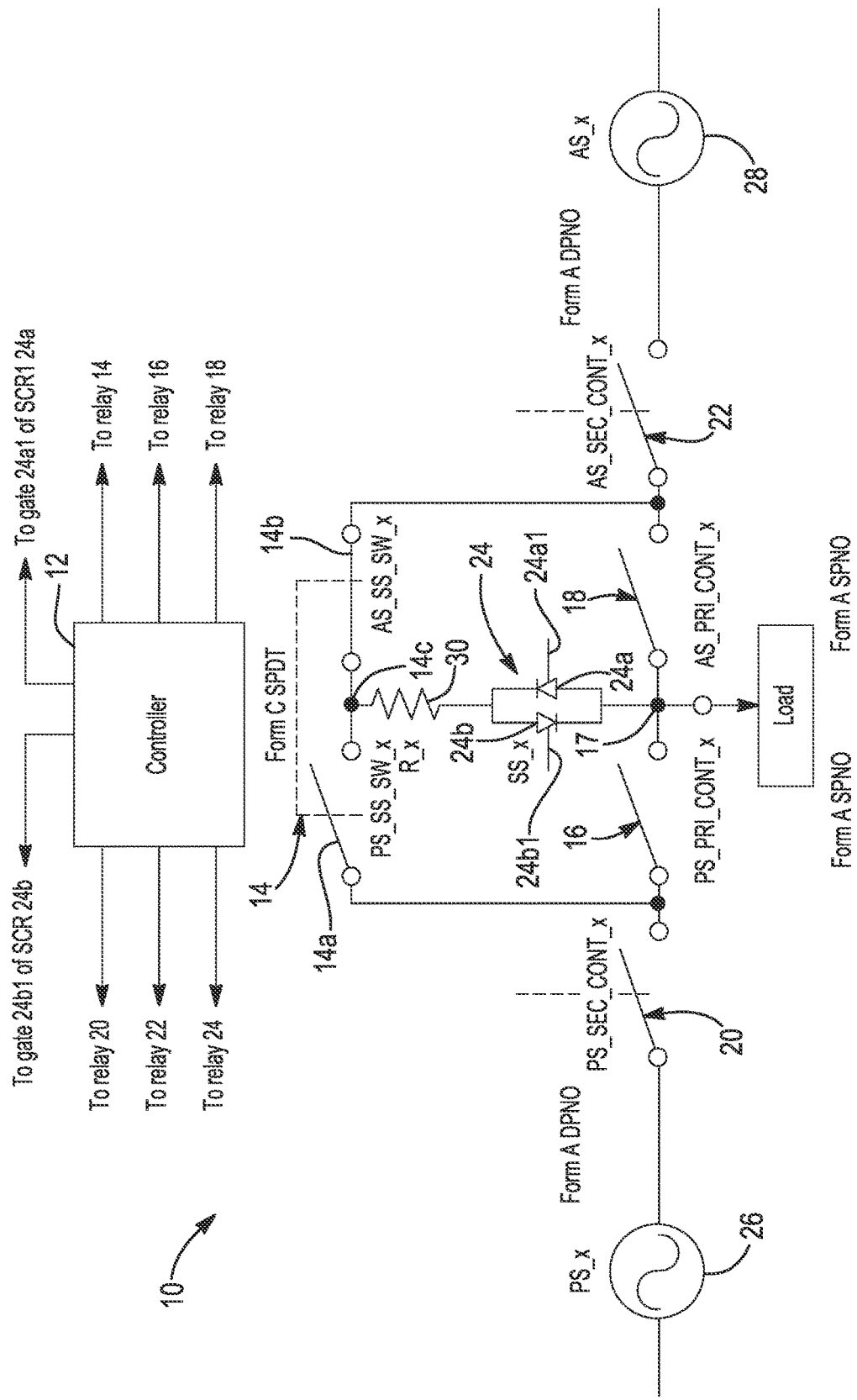
FIG. 1 is a diagram of one embodiment of a shared, hybrid transfer switch system coupled to a primary power source and a secondary power source. The switching topology is symmetrical on both sides of the load, so only one side is illustrated to not clutter the drawing.

Referring to FIG. 1, a shared-hybrid switching system 10 is shown in accordance with one embodiment of the present disclosure. In this embodiment the system 10 includes a controller 12 for controlling the switching of a plurality of relays 14a and 14b, 16, 18, 20, 22, and an anti-parallel SCR pair 24, to control switching of power from one or the other of a "preferred" or primary AC power source 26 and an "alternate" or secondary AC power source 28, to a Load. It will be appreciated that the switching topology is symmetrical on both sides of the Load, so only one side has been illustrated in FIG. 1 so as to avoid cluttering the drawing. Common sides of the relay contacts 14*a* are coupled to one another at a first common connection point 14*c*, and one side of the anti-parallel SCR pair 24 is also coupled to the first connection point 14*c*. The opposite side of the anti-parallel SCR pair 24 is coupled to a second common connection point 17 along with common sides of the primary relays 16 and 18. The Load is also in communication with the second connection point 17. Merely for the purpose of aiding in the description of operation of the system 10 in the following paragraphs, the relays 14*a* and 16 may be viewed as a "first plurality" of relay contacts, and the relay contacts 14*b* and 18 may be viewed as a "second plurality" of relay contacts.

A thermistor 30, in this example a NTC thermistor, is coupled between one side of the SCR pair 24 and the first common connection point 14*c*, and forms a current limiter to mitigate contact current overload when the anti-parallel SCR pair 24 is turned on during a transition operation. The Load may be one or more devices or subsystems requiring AC power for operation, for example one or more servers, network switches, power distribution units (PDUs), or virtually any other component that requires AC power for its operation. The system 10 may be located within a suitable housing (not shown) and mounted in a data center equipment rack, and may incorporate one or more AC receptacles (not shown) for supplying AC power directly to other devices and components.

The relay 14*a* may be part of a first Form A double pole normally open (DPNO) relay assembly with another like relay (the like relay being part of the mirror image portion of the system 10 shown in FIG. 1). The relay 14*b* may similarly be part of a second Form A DPNO relay assembly used in the mirror image portion of the system 10. Optionally, relays 14*a* and 14*b* may comprise a Form C single pole double throw (SPDT) bistable relay. While it is believed that configuring the relays 14*a* and 14*b* as portions of separate Form A DPNO relays will be the more preferred implementation, both implementations are possible.

The primary relays 16 and 18 may be Form A single pole normally open (SPNO) relay contacts (the conventional snubber circuit is not shown). The relays 20 and 22 may comprise Form A DPNO relay contacts to provide source isolation for predictable startup state and operation in a diagnostics mode (the conventional snubber circuit is not shown). By diagnostics mode, it is meant that relay 20 or relay 22 can be opened when the circuit is closed on the opposite side, so that the primary relays 16 or 18 and the antiparallel SCRs may be momentarily closed in sequence, without causing cross-conduction between the sources. By sensing the voltage change across the contacts of primary relays 16 or 18, the controller 12 may determine if relay 16 or relay 18 may be closed or opened. The anti-parallel SCR pair 24 includes SCRs 24*a* and 24*b*, with the gates 24*a*1 and 24*b*1 of the two SCRs being in communication with the controller 12. The anti-parallel SCR pair 24 likewise preferably includes a snubber circuit and a series fail safe fuse, which are not shown to avoid cluttering the drawing.

Figure 2:
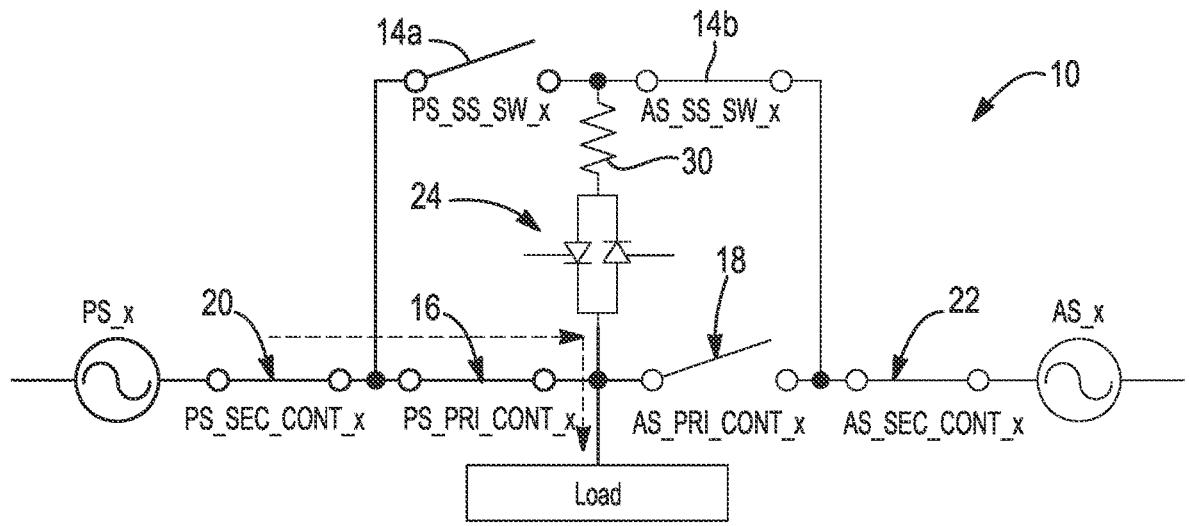
FIG. 2 shows the system of FIG. 1 with the various relay contacts in the positions they assume when the system is in a steady state of operation receiving power from a first power source.

Referring to FIGS. 2-5, the operation of the system 10 will be described. FIG. 2 shows the system 10 in a steady state of operation being supplied with power from the preferred power source 26. Relay contact 14*a* is open, relay contact 14*b* is closed, the SCRs of the anti-parallel SCR pair 24 are both turned off, relay 16 is closed and relay 18 is open. Current flows according to the dashed arrow from preferred power source 26, through relay contacts 20 and 16, to the Load.

Figure 3:
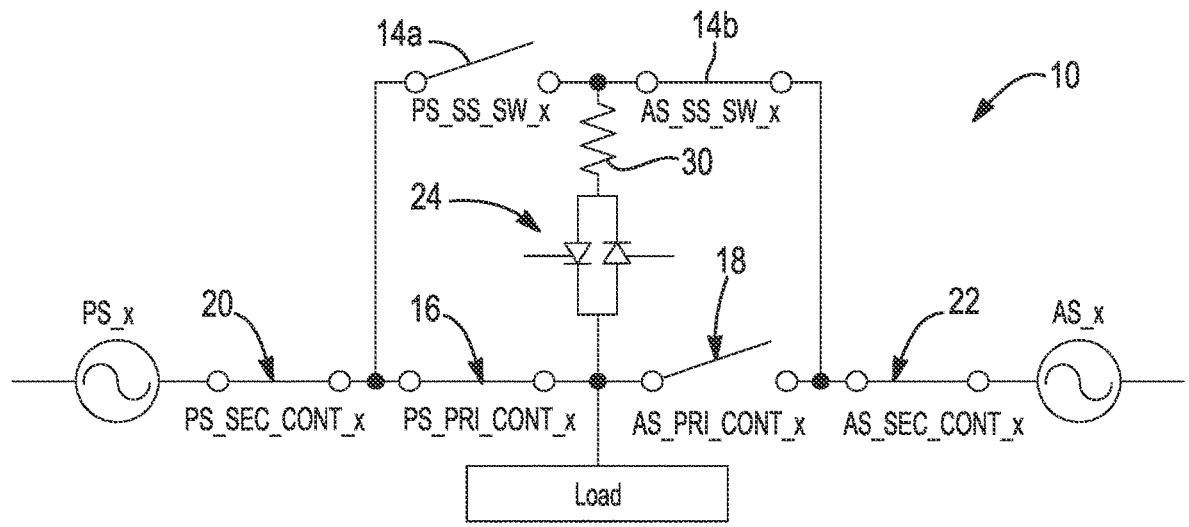
FIG. 3 shows how specific relays are controlled during a first intermediate step of a switching sequence in switching the load from the first power source to the second power source for an open transition, in which one of the relay contacts associated with the preferred power source is initially opened, to momentarily interrupt power to the Load.

FIG. 3 shows the first operation in switching to power from the alternate power source 28. The system 10, again, in this example is configured as a "break before make" system, although it is possible to control the system 10 such that it operates as a "make before break" switching system. It is expected, however, that the "break before make" control scheme will be the more preferred control configuration.

With the "break before make" switching control methodology, the relay 16 is initially opened. Relay contacts 14*a* and 14*b*, relay contact 18 and relay contact 22 remain in the same position as shown in FIG. 2.

Figure 4:
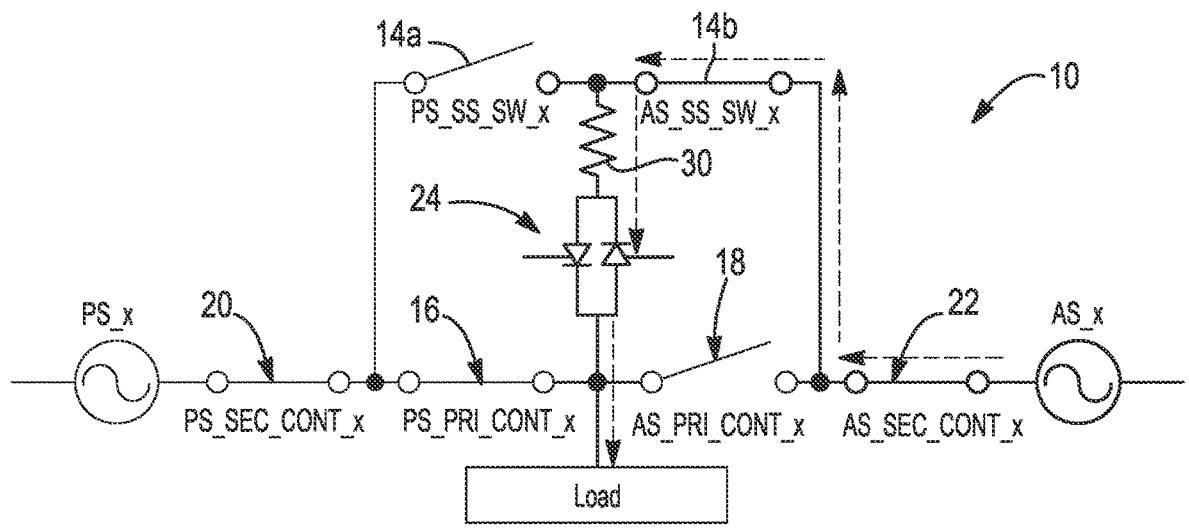
FIG. 4 shows how specific relays of the system are further controlled during a second intermediate step in which the anti-parallel SCR circuit is turned on to provide an alternate current path from the alternate power source to the Load.

FIG. 4 shows the next operation in which either the SCR 24*a* or the SCR 24*b* of the SCR pair 24 is then triggered on by the controller 12. It should be understood that the two SCRs in the SCR pair 24 do not both conduct simultaneously when triggered on by the controller 12. One of the SCRs conducts during the positive quadrant of the sinusoid, and the other conducts during the negative quadrant of the sinusoid. Thus the SCRs 24*a* and 24*b* conduct alternately as the sinusoid alternates positive and negative. All of the relay contacts 14*a*, 14*b*, 16, 18, 20 and 22 remain in the same state as shown in FIG. 3. With either the SCR 24*a* or the SCR 24*b* triggered on, current now flows from the alternate power source 28 through relay contact 14*b*, and through the SCR 24*a* or SCR 24*b* to the Load. For convenience, the alternating operation of the SCRs 24*a* and 24*b* will hereinafter be described as the operation of the "anti-parallel SCR pair 24".

Figure 5:
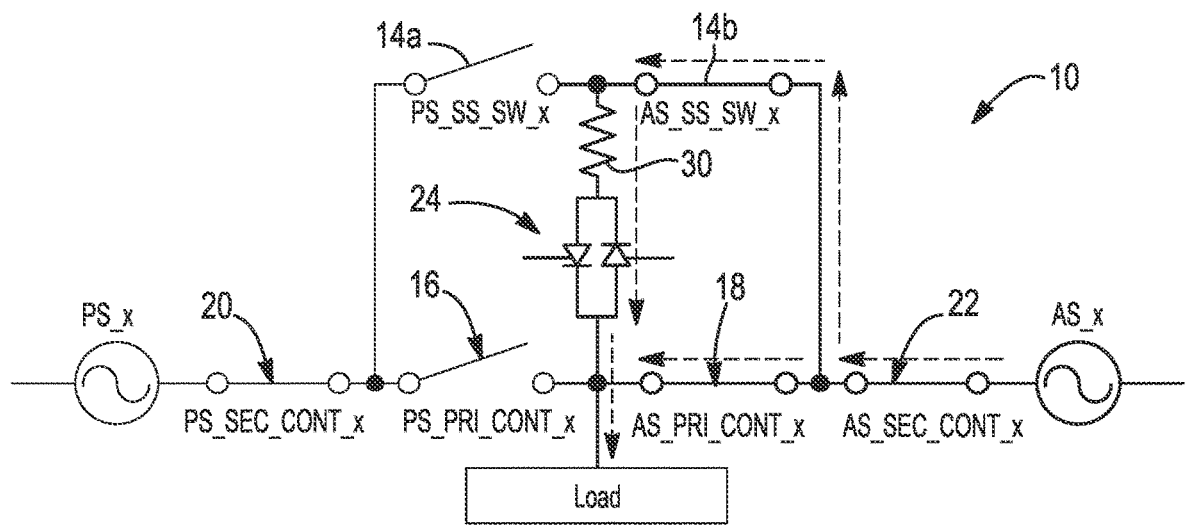
FIG. 5 shows how specific relays of the system are further controlled during a further intermediate step, in which one of the relay contacts associated with the alternate power source is closed, with the anti-parallel SCR circuit forming an alternate current path to the Load.

FIG. 5 shows the next operation in which, while the anti-parallel SCR pair 24 is maintained in an "on" state by the controller 12, the controller closes relay contact 18. This places the anti-parallel SCR pair 24 in parallel with relay contact 18. Current is thus able to flow to the Load through relay contacts 18 and 22, as well as through the combination of the relay contact 14*b* and the anti-parallel SCR pair 24. It will be appreciated that the anti-parallel SCR pair 24 has essentially enabled power to be provided until the relay contact 18 is closed in FIG. 5, thus overcoming the delay time that would have otherwise been experienced in waiting for the relay contact 18 to respond and fully close.

Figure 6:
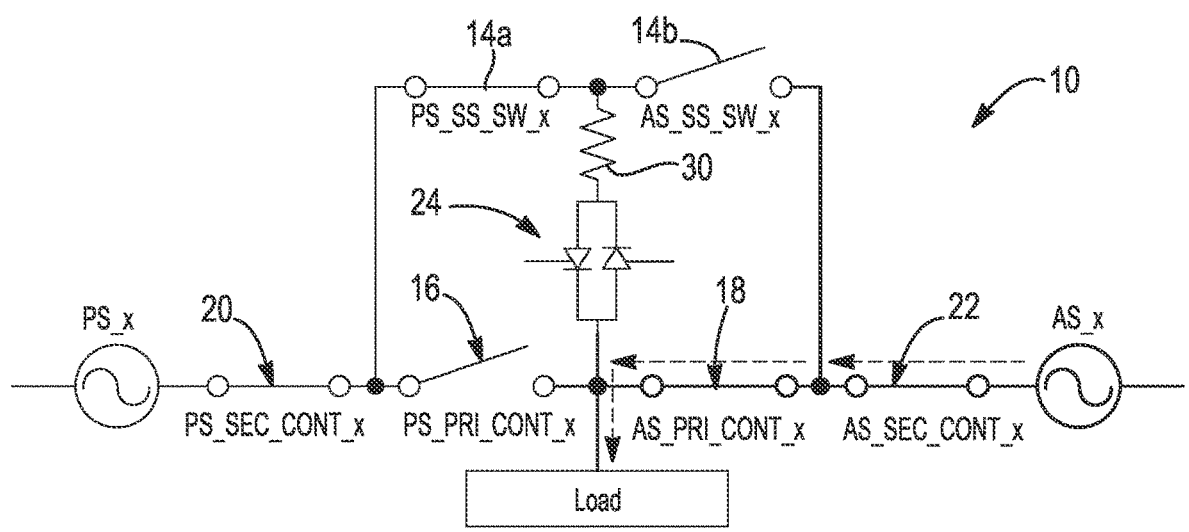
FIG. 6 shows the positions of the contacts of the various relays of the system when the system is operating in a steady state after having transitioned to using a second power source, and after having turned off the anti-parallel SCR circuit.

FIG. 6 shows the next operation in which the anti-parallel SCR pair 24 is no longer triggered by the controller 12 and naturally commutates off, relay contact 14*b* is opened and relay contact 14*a* is closed. This final configuration of the relays 14*a* and 14*b* shown in FIG. 6 prepares the system 10 for the next transition in the event the preferred power source 26 is re-selected as the power source for the system 10.

Figure 7:
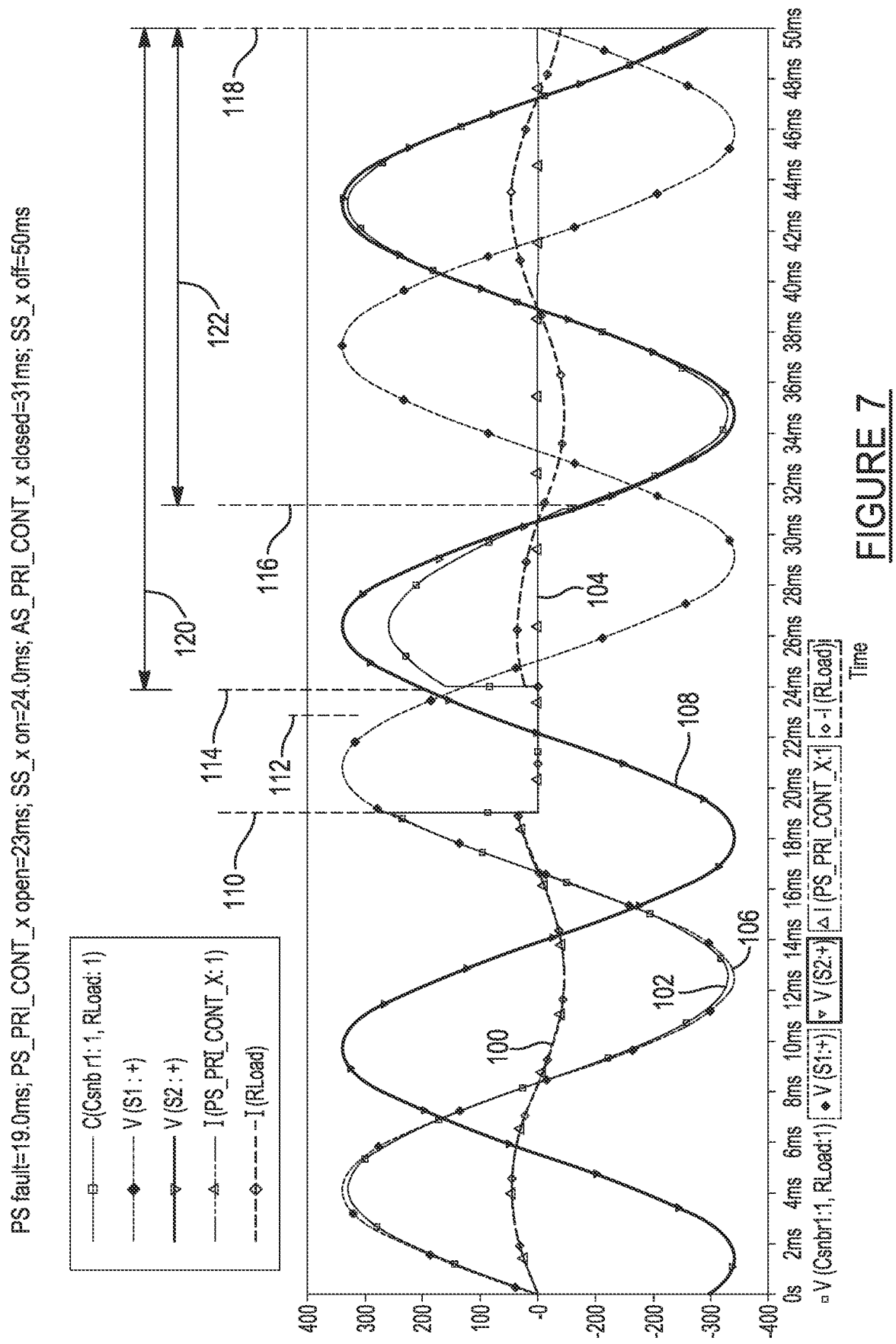
FIG. 7 is a graph showing the timing of the transitions that occur when switching from the preferred power source to the alternate power source.

FIG. 7 shows a plurality of graphs to illustrate the timing of the above described transition from the preferred power source 26 to the alternate power source 28. It should be understood that the FIG. 7 depicts idealized (simulated) waveforms; in an actual circuit, when contacts are commanded to open, they cannot break instantaneously, as shown here. Curve 100 represents the current through relay contacts 20 and 16 and the Load when the preferred power source is active; curve 102 represents the voltage across the Load; line 104 represents the current through the relay contact 22 and 18 and the Load when the alternate power source is active; curve 106 represents the preferred power source voltage before relay contact 20; and curve 108 represents the alternate power source voltage before relay contact 22. At point 110 a fault occurs, which is at the 19.0 ms point on the graph. Current to the Load drops to zero and the controller 12 commands relay contact 16 to open. At point 112, which is 23 ms on the graph timeline (i.e., 4 ms after the fault occurs), the relay contact 16 finally opens after its inherent delay. At point 114, which is 24 ms on the graph timeline (i.e., 5 ms after the fault has occurred), the anti-parallel SCR pair 24 is triggered on and relay contact 18 is commanded to be closed by the controller 12. This action occurs only 5 ms after the fault is detected. At point 116, which is 31 ms on the graph timeline, the relay contact 18 finally opens after its inherent delay. At point 118, which is the 50 ms point on the graph, the anti-parallel SCR pair 24 is no longer triggered by the controller and naturally commutates off. Arrow 120 represents the total time duration during which one of the SCRs of the anti-parallel SCR pair 24 is conducting and supplying current to the Load, while arrow 122 indicates the total overlap time during which one of the SCRs of the anti-parallel SCR pair 24 is connected in parallel with the relay contact 18. In this example the total time that the Load experiences no power being supplied is only 5 ms, which is well within the desired timeframe of 8 ms or less at a 60 Hz line frequency as specified by the ITIC curve developed by the Information Technology Industry Council.

Figure 8:
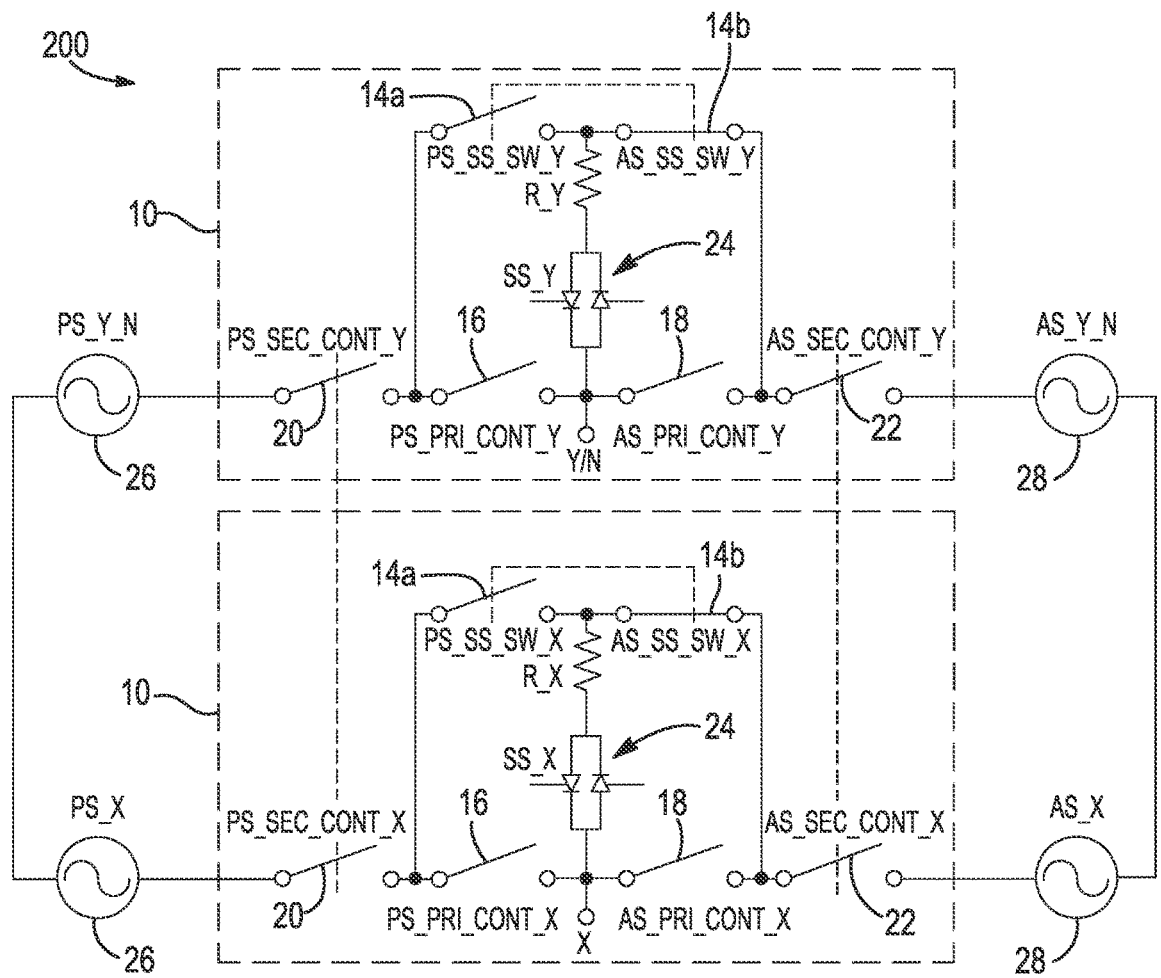
FIG. 8 shows an embodiment of the system configured to handle a single phase AC power source.

FIG. 8 shows a system 200 in accordance with the present disclosure configured to implement a single phase topology. In this embodiment essentially two iterations of the system 10 are incorporated, with each pair of relays 14a, 14b, 20 and 22 being respectively controlled together.

Figure 9:
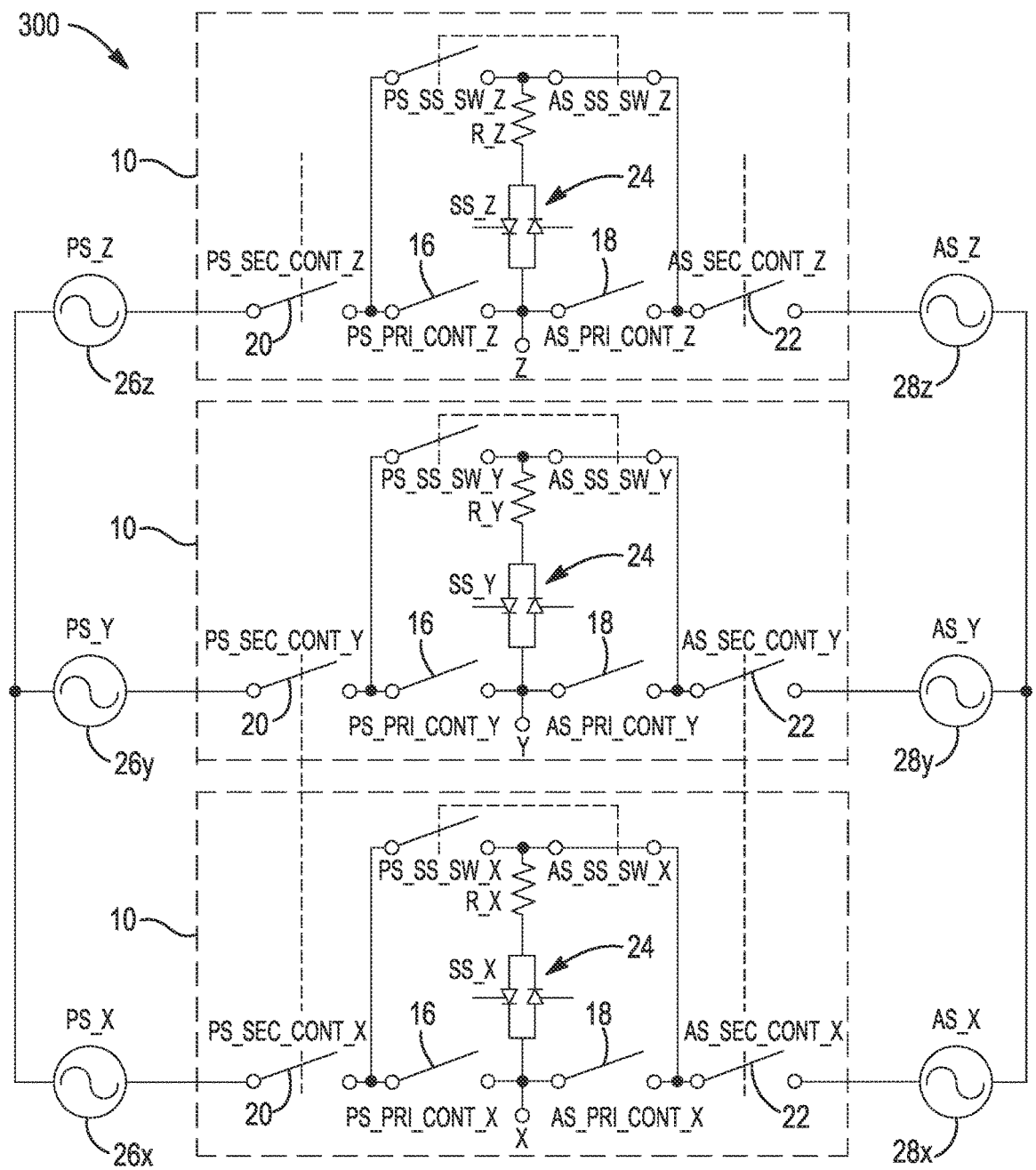
FIG. 9 shows an embodiment of the system configured to handle a 3-phase delta AC power source.

FIG. 9 shows a system 300 in accordance with the present disclosure configured to implement a 3-phase delta topology. One instance of the system 10 is used for controlling transitions from each of the X, Y and Z phases 26x/26y/26z of a preferred power source to the X, Y and Z phases 28x/28y/28z of an alternate power source.

Figure 10:
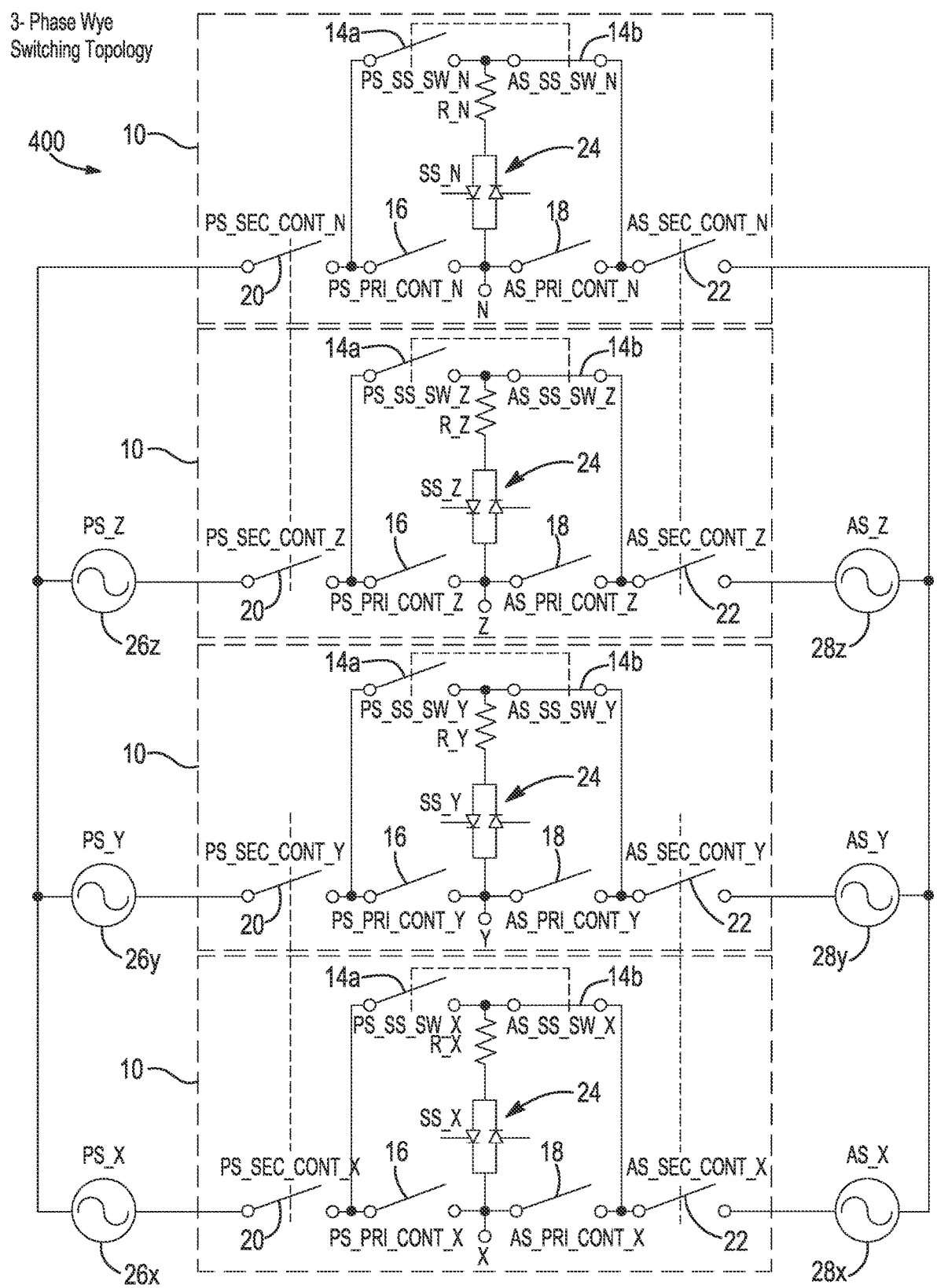
FIG. 10 shows an embodiment of the system configured to handle a 3-phase wye configured AC power source.

FIG. 10 shows a system 400 in accordance with the present disclosure configured to implement a 3-phase wye topology. In this implementation four instances of the system 10 are used to control transitions from each one of the preferred power phases X, Y and Z (labelled 26x, 26y, 26z), and the Neutral, and the alternate power source phases X, Y and Z (labelled 28x, 28y and 28z), and the Neutral line. In this implementation the relay contacts 20 of the two instances of the system 10 associated with the X and Y phases are switched together, and the relay contacts 20 of the two instances of the system 10 associated with the Y phase and the Neutral line are switched together. The relay contacts 14a, 14b and 22 are handled in the same fashion.

The various embodiments of the system 10 presented herein may also be implemented in a "make before break" ("closed transition") configuration. The source voltages phasing may be unsynchronized or synchronized, with the latter condition required for the "closed transition" configuration.

Although the various embodiments described herein illustrate an anti-parallel SCR pair 24 as the solid-state switching component, it will be appreciated that other solid-state components, for example and without limitation, insulated gate bipolar transistors (IGBTs) or TRIACs may be used as the solid state switching devices with little modification required to the system 10.

Another advantage of the present system 10 is that since the anti-parallel SCR pair 24 is only required to carry current for a brief time interval until the relay contacts 16 and 18 have settled during a transition operation, the SCRs of the anti-parallel SCR pair 24 may have a lower duty rating that what would otherwise be needed to handle the current flow from the preferred power source 26 or the alternate power source 28.

The system 10 also provides a significant "soft start" benefit in that, at start up, the anti-parallel SCR pair 24 are gradually triggered at larger conduction angles until turned on fully. This ramps up the voltage so that the current flow into the Load is effectively ramped up, too. This soft start benefit also mitigates inrush current during a cold start, when power is initially applied to a reactive load in a fully discharged state.

The use of the solid-state anti-parallel SCR pair 24 in parallel with the contacts facilitates fast transfer, of course, but also the shunting action of the SCRs means that the relay contacts can naturally bounce into a final closed position without causing arcing, wear and erosion of the contact surface of each of the relays, which often occurs with conventional power transfer circuits when abruptly switching from one power source to another. The significant reduction and/or elimination of contact bounce can extend the life of the relay contacts, as well as reduce the stress on other various components of the system 10 caused by large inrush currents.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A shared hybrid transfer switch for transferring power received by a Load from a preferred AC power source to an alternate AC power source, and for transferring power being received by the Load from the alternate AC power source to the preferred AC power source, the shared hybrid switch comprising:
    a first plurality of relay contacts enabling selective coupling between the preferred AC power source and the Load;
    each one of the first plurality of relay contacts having one side thereof connected together and able to receive power from the preferred power source;
    a second plurality of relay contacts enabling selective coupling between the alternate AC power source and the Load;
    a solid-state switch configurable between open and closed states;
    each one of the second plurality of relay contacts having one side thereof connected together and able to receive power from the alternate AC power source;
    a first select one of the first plurality of relay contacts being connected at a first common connection point, and where the first select one of the first plurality of relay contacts helps to form one current path to the Load when closed and when the solid-state switch is in the closed state, and a first select one of the second plurality of relay contacts is also connected to the first common connection point, and helps to form a different current path to the Load when closed and when the solid-state switch is in the closed state;
    the solid-state switch configured to receive control signals from a controller, the solid-state switch being coupled in series with the Load, and on a first side with the first common connection point, and on a second side at a second common connection point, and to thus enable coupling to either the preferred AC power source or the alternate AC power source, and also able to be at least momentarily coupled with the first select ones of the first and second pluralities of relay contacts; and
    the solid-state switch being controlled such that it is turned on to be in communication with one or the other of the first select one of the first plurality of relay contacts or the first select one of the second plurality of relay contacts, and also with the Load, to provide a path for current flow to the Load from one of the preferred or alternate AC power sources being transitioned to, while second select ones of each of the first and second pluralities of relays are momentarily open, to thus enable a switching transition to be made from one of the preferred or alternate AC power sources to the other; and
    the first select ones of the first and second pluralities of relays enabling simultaneously fully isolating the solid-state switch from both of the preferred and alternate power sources when both of the first select ones of the first and second pluralities of relays are open.

2. The shared, hybrid transfer switch of claim 1, wherein the solid-state switch comprises a pair of silicon controlled rectifiers configured in an anti-parallel configuration, with each of the pair of silicon controlled rectifiers including a gate in communication with the controller, and with a second side coupled to the second common connection point and a first side coupled in communication with the first common connection point.

3. The shared, hybrid transfer switch of claim 1, wherein the solid-state switch comprises a bidirectional/bilateral triode thyristor in communication with the controller.

4. The shared, hybrid transfer switch of claim 1, wherein the solid-state switch comprises an insulated gate bipolar transistor in communication with the controller.

5. The shared, hybrid transfer switch of claim 2, further comprising the controller.

6. The shared, hybrid transfer switch of claim 1, wherein:
    the first one of the first plurality of relay contacts forms a portion of a first Form A Double Pole Normally Open relay assembly; and
    the first one of the second plurality of relay contacts forms a portion of a second Form A Double Pole Normally Open relay assembly.

7. The shared, hybrid transfer switch of claim 1, wherein a first one of the relays from the first plurality of relays and a first one of the relays from the second plurality of relays comprise a single relay assembly.

8. The shared, hybrid transfer switch of claim 7, wherein the single relay assembly comprises a Form C Single Pole Double Throw (SPDT) bistable relay.

9. The shared, hybrid transfer switch of claim 1, wherein the first ones of the first and second pluralities of relays are controlled such that only one or the other is closed at a time during a power switching operation when switching from one of the preferred power source and the alternate power source to the other, to assist in forming a current flow path to the Load from either the preferred AC power source or the alternate AC power source.

10. The shared, hybrid transfer switch of claim 1, wherein the second select ones of each of the first and second pluralities of relays comprise independently controllable relay contacts which, when either is closed, help to provide a current flow path to the Load from a respective one of the preferred AC power source or the alternate AC power source.

11. The shared, hybrid transfer switch of claim 10, wherein the second select one of each of the first and second pluralities of relays comprises a Form A Single Pole Normally Open (SPNO) relay contact.

12. The shared, hybrid transfer switch of claim 1, further comprising:
   a first source isolation relay coupled between one of the first plurality of relays and the preferred AC power source, and being in communication with the controller; and
   a second source isolation relay coupled between one of the second plurality of relays and the alternate AC power source, and in communication with the controller; and
   wherein the first and second source isolation relays are selectively controlled by the controller to provide source isolation from one or the other of the preferred AC power source or the alternate AC power source and the Load, such that only one of the first or second source isolation relays is closed at any given time.

13. The shared, hybrid transfer switch of claim 1, wherein the solid-state switch is controlled by the controller so as to be closed for at least a momentary period after a current flow has been established to a different one of the preferred or alternate AC power sources from the other, to enable a current flow path to be formed between the different one of the preferred or alternate power sources and the Load for the momentary period.

14. The shared, hybrid transfer switch of claim 1, wherein the solid-state switch is configured to enable the switch transition from one of the preferred or alternate AC power sources to the other within a time period that limits a time where the Load receives no power from either of the preferred or alternate AC power sources to less than eight milliseconds.

15. The shared, hybrid transfer switch of claim 1, further comprising:
   an additional first plurality of relay contacts;
   an additional second plurality of relay contacts;
   an additional solid-state switch; and
   wherein the shared, hybrid transfer switch forms a single phase system topology for handling single phase AC power from the preferred AC power source or the alternate AC power source.

16. The shared, hybrid transfer switch of claim 1, further comprising:
   at least two additional first pluralities of relay contacts;
   at least two additional second pluralities of relay contacts;
   at least two additional solid-state switches; and
   wherein the shared, hybrid transfer switch forms a three phase system topology for handling three phase AC power from the preferred AC power source or the alternate AC power source.

17. The shared, hybrid transfer switch of claim 1, wherein the solid-state switch is controlled to enable a soft start feature to be carried out.

18. A method of forming a shared hybrid transfer switch for transferring power received by a Load from a preferred AC power source to an alternate AC power source, or transferring power being received by the Load from the alternate AC power source to the preferred AC power source, the method comprising:
   providing a solid-state switch;
   providing a first plurality of relay contacts enabling selective coupling between the preferred AC power source and the Load, and using the solid-state switch to help provide a path to the Load, when in a closed configuration, depending on which one of the first plurality of relay contacts is in a closed configuration;
   providing a second plurality of relay contacts enabling selective coupling between the alternate AC power source and the Load, and using the solid-state switch to help provide the path to the Load, when in the closed configuration, depending on which one of the second plurality of relay contacts is in the closed configuration;
   configuring a first select one of the first plurality of relay contacts and a first select one of the second plurality of relay contacts such that common sides thereof are connected at a first common connection point, and also in communication with the Load when either is closed;
   configuring second select ones of the first and second pluralities of relay contacts such that common sides thereof are connected at a second common connection point;
   a first secondary relay coupled on a first side with the preferred AC power source, and on a second side to both of the first select ones of the first and second pluralities of relay contacts;
   a second secondary relay coupled on a first side with the alternate AC power source and on a second side with the second select ones of the first and second pluralities of relay contacts;
   controlling a solid-state switch configured to receive control signals from a controller, and coupled on a first side in communication with the first connection point, and on a second side in communication with the second connection point, and further able to be coupled with the Load and with either of the preferred AC power source and the alternate AC power source, to carry out a switching transition from one of the preferred or alternate AC power sources to the other, by selectively using ones of the first and second pluralities of relay contacts;
   the first select ones of the first and second pluralities of relays enabling simultaneously fully isolating the solid-state switch from both of the preferred and alternate power sources when both of the first select ones of the first and second pluralities of relays are open
   the first secondary relay configured, when opened, to prevent power from being applied to the Load from the preferred AC power source regardless of a state of any one of the first plurality of relays; and
   the second secondary relay configured, when opened, to prevent power from being applied to the Load from the alternate AC power source regardless of a state of any one of the second plurality of relays.

19. The method of claim 18, wherein the solid state switch is controlled during the switching transition such that the solid-state switch is turned on to be in communication with one or the other of the first select ones of the first and second pluralities of relay contacts, and also with the Load, to provide a path for current flow to the Load from one of the preferred or alternate AC power sources being transitioned to, while the second select ones of the first and second pluralities of relays are both momentarily open, to thus enable the switching transition to be made from one of the preferred or alternate AC power sources to the other.

20. The method of claim 18, wherein controlling the solid-state switch comprises at least one of:

controlling a pair of silicon controlled rectifiers configured in an anti-parallel configuration, with each of the pair of silicon controlled rectifiers including a gate in communication with the controller; or controlling a bidirectional/bilateral triode thyristor in communication with the controller and with the Load, and in communication with selective ones of the first and second pluralities of relay contacts; or controlling an insulated gate bipolar transistor in communication with the controller and with the Load, and in communication with selective ones of the first and second pluralities of relay contacts.

21. The method of claim 19, wherein the preferred and alternate AC power sources are single phase AC power sources.

22. The method of claim 19, wherein the preferred and alternate AC power sources are three phase AC power sources.

\* \* \* \* \*